United States Patent
McAulay et al.

(10) Patent No.: US 6,758,893 B2
(45) Date of Patent: *Jul. 6, 2004

(54) GRANULAR PIGMENTS USEFUL TO COLOR CONCRETE

(75) Inventors: Hugh Joseph McAulay, Co. Durham (GB); George Podolsky, Kirkwood, MO (US); Andrew Morris, Co. Durham (GB); Roy Laundon, Darlington (GB)

(73) Assignee: Elementis Pigments, Inc., East St. Louis, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/174,691

(22) Filed: Jun. 20, 2002

(65) Prior Publication Data

US 2004/0040469 A1 Mar. 4, 2004

(51) Int. Cl.$^7$ .................................... C09C 1/36

(52) U.S. Cl. ...................... 106/436; 106/439; 106/453; 106/712; 264/118; 264/141

(58) Field of Search ................................. 106/436, 439, 106/453, 712; 264/118, 141; 23/313 R

(56) References Cited

U.S. PATENT DOCUMENTS 5,322,563 A * 6/1994 van Bonn et al. .......... 106/712
6,562,120 B2 * 5/2003 Emery et al. ............... 106/436

* cited by examiner

*Primary Examiner*—C. Melissa Koslow
*Assistant Examiner*—Shalie Manlove
(74) *Attorney, Agent, or Firm*—Michael J. Cronin

(57) ABSTRACT

A method for the preparation of pigment granules includes mixing at least one pigment selected from the group consisting of iron oxide and chromium oxides with 1–25 wt. % water to form a damp powder. The damp powder is then pressure extruded through at least one die to form granules. The granules are then dried so that the final water content of the granules is less than about 1%, crumble and sieved to form the final product.

17 Claims, No Drawings

GRANULAR PIGMENTS USEFUL TO COLOR CONCRETE

CROSS-REFERENCE OF RELATED APPLICATION

This subject matter of this application is related to U.S. Ser. No. 09/530,913, which is the U.S. National Stage application of PCT/GB99/02974 (WO 00/14163 published on Mar. 16, 2000), the disclosures of which are expressly incorporated herein by reference.

FIELD OF INVENTION

The present invention is directed to the manufacture of pigment granules, for example, iron oxide and chromium oxide pigments of a type useful for coloring concrete and other products. Granules made according to the processes of this invention often surprisingly produce coloring in concrete systems superior to that of the starting pigments.

BACKGROUND OF INVENTION

In General

Since at least the middle of the Nineteenth Century to the very present day, iron oxide has been used as the pigment of choice in an increasing variety of systems. Natural iron oxide actually was mined and used in paints before the American Civil War and such paint use continues, on a very large scale, into the twenty-first Century. Cosmetics, pharmaceuticals, waxes, coatings, inks, paper and a growing number of other new products continue to depend on iron oxide to provide the bright colors which some people believe define the vividness of modernity and our present time.

A major application of iron oxide (and chromium oxide) is in the pigmentation of cement and concrete products (e.g. paving slabs and blocks), and such colored concrete products are experiencing a growing and accelerating use throughout both the Western and Eastern worlds. Metal oxide pigments have been used in the form of a powder in the concrete business until very recently when customer preferences for a granule form became known.

Powdered metal oxide pigments are dusty, thereby giving rise to health hazards and making storage and handling difficult. Also, the powders are not free flowing and so cannot readily be conveyed through pipes, which become blocked by the powder. Further, the poor flowing properties of powders makes it hard to meter them using auger screws to ensure the correct proportion of pigment to base material (e.g., concrete).

Prior Developments

Similar problems are known in other industries (e.g., in the animal feedstuff industry). Such problems have been solved to a substantial extent by granulating the product. However methods of making these granules for concrete use have been difficult to optimize and are the subject of an ongoing investigation by many companies with much prior art reflecting the search for a process that is both effective in producing useful granules and is relatively inexpensive to implement. The guiding purpose of scientists working in the field has been to produce granules of sufficient strength to be transported and stored without breaking into dust and to simultaneously provide coloration properties to concrete close, or in rare cases equal, to that of the pigment itself. A substantial universe of patents has been issued in the field of this invention.

For example, Degussa U.S. Pat. No. 4,366,139 discloses granulating pigment used in the pigmentation of paper, cement, and concrete including specifically carbon blacks. Carbon blacks give rise to an even greater dusting problem than iron oxides since the particle size of carbon black powders are much smaller than that of iron oxide powders. Carbon blacks also suffer from the problem of floating on base material, which makes incorporation into the base material difficult. According to this patent, the twin problems of dusting and poor incorporation are solved by mixing carbon black with at least 30% water and optionally also a wetting or dispersing agent in an amount of 0.5 to 12% and preferably 5 to 10% (based on the amount of the carbon black) and subjecting the resulting mixture to compression forces in a pearlising machine to form pearls or granules. Depending on the nature and operation of the pearlising machine, the compression forces can be substantial.

U.S. Pat. No. 4,277,288 issued 1979 to Ciba Geigy discloses manufacturing pigment granules by forming a fluidized bed of pigment powder and adding into the bed an organic liquid or wax as a binder to promote granulation. A surfactant is also added.

U.S. Pat. No. 4,946,505 issued to Chemische Werke Brockhues A. G. discloses that no compression or briquetting forces at all must be applied to pigments during the formation of pigment granules for use in coloring of concrete and cement in order to obtain satisfactory production. This is achieved by an agglomeration technique (e.g., by drum granulizing machines). The agglomeration brings individual pigment particles into contact with each other in the presence of water and a binder (e.g., lignin sulphonate), whereupon the particles adhere to each other (coalesce) to form granules. Preferably, pigment granules are formed by spray drying a mixture of the pigment, water, and a binder. The method disclosed requires the presence of a considerable amount of binders to ensure that the pigment particles adhere to one another and use costly spray drying equipment.

Bayer U.S. Pat. No. 5,215,583 discloses building materials colored with pigments, for example iron oxide pigments, in the form of granules produced from a suspension of one or more pigments. The suspension also contains 0.05–5% of soluble salts, based on pigment weight.

U.S. Pat. No. 5,215,584 discloses building materials such as plaster, lime sand bricks, fiber cement parts, cast stones, roof tiles, and flagstone that are colored by incorporating organic granules produced from a suspension of one or more inorganic pigmenting agents and a hydrolyzed or poorly soluble compound of one or more ion types present per se as an essential constituent in one or more pigments.

U.S. Pat. No. 5,401,313 issued to Elementis Pigments, Inc. the assignee of this invention, describes a spray drying process wherein an added step of coating the pigment particles-with electric charges through use of a surface treatment is utilized.

U.S. Pat. No. 5,484,481 issued to Bayer discloses a process for the granulation of pigments for use in dyeing cement and concrete involving compacting pigment powders in the presence of a binder to form flakes; breaking up the flakes; and rounding the ground flakes using known techniques (e.g., using rotating pans or drums, which involve the application of water and a binder to the ground flakes).

Degussa U.S. Pat. No. 5,480,626 and U.K. Patent No. 0598318 disclose a process for the production of spherical granulates from powdered solids. The solids are uniformly moistened while being mixed in a mixer by the addition of a moistening agent and optionally a binder and other additives. The mixture is pressed through an annular die press having variable slippage between the annular die and press roller to yield cylindrical strands. The invention requires that the strands are then rounded in a rounding unit having a complicated and expensive ribbed plate to yield spherical granulates. The patent further teaches not to use extruders because of their high investment costs and the difficulties associated with slight moisture changes.

U.S. Pat. No. 5,853,476 issued to Elementis Pigments, Inc., shows a compaction process relying in a preferred embodiment on Bepex MS compactors to make granules for concrete coloration. While very effective, the process is relatively expensive. The patent teaches the use of recycling of oversize and undersize material streams in a process that both creates enhanced color in the concrete and saves the cost of waste disposal.

U.S. Pat. No. 5,634,970 issued to Bayer A. G. relates to a process for the coloration of organic media by granulated inorganic pigments. The possible processes discussed include spray granulation (spray drying via disc or nozzle) and pelletizing (mixer, fluidized bed granulation, disc or drum) and then describes the preferred invention as a multi-stage process compacted in a compactor (Bepex 200/50). U.S. Pat. No. 6,132,505 also issued to Bayer A. G. shows a related process to make pigment pellets for coloring building materials using both compaction and crushing steps with polyethylene glycols and similar water soluble liquids as required auxiliary substances.

U.S. Pat. Nos. 6,241,167 and 6,079,644 again to Bayer disclose processes for producing briquetted and pressed granular material and the use thereof for coloring building materials, such as concrete. The patents show a variety of recycling steps.

See also recent Bayer U.S. Pat. Nos. 6,270,566, and 6,364,223 and Lafarge Braas GmbH U.S. Pat. No. 6,268,410.

Special Considerations

The granulation of pigments must meet criteria not required in other industries where pelletization is common. The pigment granules must be capable of being readily dispersed in the base material to color it uniformly since if they did not readily disperse, they would give rise to streaks or pockets of color, which detract from the appearance of the final product. Thus, granules should be able to be dispersed in the base material while at the same time, and in a contrary direction, should be sufficiently coherent and robust that they do not break down into powder during storage or handling.

The manufacturers of concrete (whether wet or semi dry) also generally require that pigments contain as few unnecessary additives as possible. It would therefore be desirable to be able to produce pigments with substantially reduced amounts of binders and, if possible even to eliminate such additives.

It has generally been thought indispensable commercially to use one or more binders (other than water or other material that is or can be removed after the formation of the granule) in the manufacture of pigment granules to give the granules strength to resist being broken up into powder during handling and storage and to promote the dispersion of these granules in their end use.

OBJECT OF THE INVENTION

It is an object of the present invention to manufacture pigment granules that are readily and very rapidly dispersible in a base medium, are robust and have a reduced liability to dusting (i.e., to being broken down into powder). It is a further important object to develop a far less expensive and much simpler process than those presently commercially used most particularly less expensive than spray drying and ball press processes.

It is a further object of the present invention to provide a process of manufacturing readily dispersible pigment granules without the use of substantial quantities of binder and in some cases no binder at all.

DETAILED DESCRIPTION OF INVENTION

According to the present invention, there is provided a process for the preparation of low dusting, free flowing granules of at least one pigment selected from the group consisting of iron oxides and chromium oxides. This process uses simpler and less expensive equipment than used in present manufacturing processes such as spray drying, ball milling and similar processes, eliminates the need for a rounding step and produces product of equal or better quality than known processes. Surprisingly the process makes products often having equal or better coloring properties than the pigments from which they were made.

The process comprises mixing at least one pigment with water to form a mixture; pressure extruding the mixture through at least one die to form granules, thereby also compacting the mixture; and drying the resultant granules, so that the final water content of the granules is less than about 5 wt. %, most preferably less than 1 wt. %. It has been surprisingly discovered that the action of forcing the material through die holes during the process exerts a substantial compaction force on the individual pigment particles, thereby increasing the strength of the granules. In addition, the use of small amounts of water assures that most of the pigment particles are not moistened so that the particles when introduced into concrete rapidly disperse compared to prior art products.

Dispersants and/or binders may be added to the mixture, and, while both properties are required in the final product, it is recognized that some binders can exhibit some dispersant characteristics and dispersants may exhibit some binder characteristics. Preferably a single chemical which is both a binder in the granular form and a dispersant when the granule enters into the concrete system it is to color, should be selected—we call this class of products, binder/dispersants.

Examples of suitable binder/dispersants are BORRESPERSE NA® (sodium lignosulphonate), ULTRAZINE NA® (sodium lignosulphonate), PEXOL 2000® (saponified rosin soap), DRESINATE 214®, DISPEX N40® (sodium polyacrylate), NARLEX LD31® (sodium polyacrylate), and SUPAREX DP CC002® (sulphonated naphthalene formaldehyde condensate). Dispersant products (e.g., anti-flocculents or wetting agents), such as sodium alkylbenzene sulphonate, also make suitable additives, as they can provide some additional lubricating properties for the extrusion process, as well as improving the dispersion properties in the end use and are included within the foregoing definition.

Binders that have little or no dispersant characteristics can also be used often in combination with one or more dispersants with little or no binding capacity.

The present invention encompasses the use of binder/dispersants and binders combined with dispersants comprising at least one material selected from the group consisting of stearates, acetates, alkylphenols, cellulosics, lignins, acrylics, epoxies, urethanes, sulphates, phosphates, formaldehyde condensates, silicates, silanes, siloxanes, and titanates. The binder/dispersant used may also be at least one material selected from the group consisting of lignin sulphonate, polyacrylates, a salt of naphthalene sulphonate formaldehyde condensate which contains polycarboxylate, a salt of rosin size, a salt of disproportionated rosin, acetylenic diol on nonmetallic oxide, sodium alkylbenzene sulphonate, nonyl phenol-ethylene oxide condensates, glycerol-based ethylene oxide-propylene oxide co-polymers, and di-octyl sulphosuccinates. The weight of at least one binder or dispersant is from about 0.001 to 10% by weight based on the pigment.

A. Mixing

The pigment, water, and optional additives are mixed together. Any mixer can be used; especially preferred are those that apply little or no mechanical shear to the pigment, water and. additives in order that a paste is not formed. In an embodiment of the present invention, iron oxide powder may be added to one of two identical cone blenders comprising a vertical, rotating screw for mixing, and an intensifier (a high speed rotating blade with spray nozzles at the blade tips) for homogeneous addition of water and various additives. Water is added at around 1–30 wt. % of total finished batch weight and is primarily added to lubricate the oxide during the later extrusion process; preferably around 10 to 20% water is used and most preferably 15% water.

Additives may be added such as sulphonated naphthalene formaldehyde condensate (concrete dispersant); sodium lignosulphonate (granulate binder); sodium alkyl benzene sulphonate (wetting agent to promote homogeneity); and light sodium carbonate (pH modifier). The iron oxide is added to the mixer from bulk bags. The additives may be added to the water before addition to the mixer. This water/additive mix may be produced in quantities of 2000–3000 kg at a time in a separate tank.

It is essential to this invention that the mixture remains a damp powder and does not become a paste. To accomplish this according to the present invention, water is added to the mixture in an amount of about 1–30% and preferably about 10–20% by total weight. It has been found from a processing aspect that if the resultant mixture remains a damp powder, and does not form a paste, then superior more rapidly dispersible products are obtained. The low water content is crucially important to (1) forming a stable granule; (2) forming a granule that will re-disperse very promptly when introduced into concrete; and (3) producing discrete granules rather than just a long ribbon.

B. Extrusion

The damp powder can be fed to any extrusion device.

Many die extrusion devices are known. Die presses for compacting by extruding powder are the oldest pressure agglomeration machines. They are used by numerous industries for a wide variety of purposes. They are widely used in the ceramic, powder metal, confectionery, catalyst, and, to an increasing extent, the general chemical industries. The machines can be divided into two main categories: reciprocating or single-stroke machines and rotary machines.

Reciprocating presses generally operate with one upper and one lower punch in a single die. They are mainly used for complex shapes where high pressure is required.

Reciprocating machines can be further subdivided into two types: ejection presses and withdrawal presses.

Preferred extrusion devices for this invention are those whereby the mixture is forced by pressure through holes in a die, which is preferably a perforated plate or screen. This can be achieved by the action of a screw pushing the mixture through the die or by the action of a moving blade or a roller (or similar pushing device) wiped over the die and thereby compressing and forcing the mixture through the die.

The development of a predetermined pressure presents no difficulty, but in extrusion the situation is somewhat more complicated. The peak pressure developed at each stroke depends not only on the power exerted by the ram but also on the resistance to the forward movement of the material to be extruded. The latter is influenced by many factors: the shape and length of the channel, die or bore, the changes in cross-section in relation to length, the smoothness of the tool walls, the nature of the material to be processed including parameters such as temperature, structure, plasticity, etc., and the type and length of the curing channel if applicable.

The rate of pressure increase is also important. It depends on stroke frequency and length and on the rather complicated relationship between movement of the blade and magnitude of the resisting frictional force between extrudate and die as well as the force caused by the column of already compressed product being pushed forward. These forces change with both state of compaction and rate of movement.

It is believed although complicated that most artisans working in the field of this invention will have no problem in duplicating the invention unexpectedly developed herein.

The force of the pressure used to push the material of this invention through the die holes acts in two directions. The smallest amount of force is used to actually push the mixture through the die hole. The force applied also, surprisingly, results in high lateral pressure that compacts the material as it passes through the die. Compacting pressures as high as 20–28,000 psi can be obtained using relatively simple and readily available die equipment.

Typically the die holes should be between 0.3 mm and 4 mm in diameter, but could be smaller or larger. The resultant granules preferably have a diameter in a range of 0.5 to 4 mm but could be larger or smaller.

In a particularly preferred embodiment of the present invention, a damp powder is fed from the bottom of a cone blender via vibration feeders to an extrusion press comprising a rotating die inside of which is a static bar with 2 rollers, one at each end. The rollers are turned by the action of the damp powder being carried toward them by the rotation of the die, thereby forming a nip point. The die comprises numerous drilled holes of a diameter between 2 and 10 mm preferably 4 mm. These are open-ended allowing the formation of pellets where their length is controlled by a cutting knife. Typically the formed pellets are 6–10 mm in length, although some crumb is formed by the action of the knife, and with a moisture content 1–2% lower than added at the blending stage as water is lost due to heat build from the force exerted through the die.

The heavy compaction lateral shear forces exerted and the mechanical energy input for the granule formation (and thus the compaction pressure exerted on the damp powder) can be adjusted by (1) changing the extrusion hole size (the larger the diameter, the lower the shear), and/or (2) changing the extrusion speed, (e.g. the speed of the wiper blade/roller) and/or (3) changing the feed rate.

The compaction exerted on the pigment during granule formation brought about by the shear force and mechanical energy input during extrusion determine the redispersion and strength properties. By suitably setting these parameters during the manufacture of the extruded granules, the properties of the granules can be adjusted to match their intended end use. For example, in uses where redistribution is not a problem, high compaction forces should be used during manufacture, which will mean that the granules will have high impact strengths and a low propensity to form dust during storage and handling. However, where easy redistribution properties are required, somewhat lower compaction forces should be used, but this will also make the granules less strong and is not preferable.

C. Drying

The extruded granules are dried (e.g., in a tray drier, band dryer, fluidized bed dryer, and the like). In embodiments, the pellets (and crumb) are fed into a fluid bed drier where moisture is removed to less than 1% by weight of total mass. Pellet integrity is desirable at this stage as fines will be removed to a cyclone (for recovery) or on to a bag filter (for waste disposal).

D. Screening and Comminuting

The dried granules may be screened to remove fines and/or oversized granules. Both the fines and the oversized granules can be recycled, although the oversized granules can be mechanically reduced in size and rescreened.

In addition, as an important part of this invention, oversize material is passed through crumbler (a flake crusher). Crumbling the granules has been found to provide superior color in a concrete base material, and can result in a wide particle size distribution of crumbled granules (e.g., 150–1500 micron). It is particularly important that the shape of the granules is irregular, as it has been found that this shape both provides superior properties to the concrete and is much easier to disperse into the concrete.

After passing through the crumbler, the material may be passed back through a vibrating screen deck where only finished material and fines should be generated. It is proposed that ultrasonic rings will be fitted to the 150 micron mesh to prevent blinding.

In embodiments, the dried granule pellets and any crumb may be screened through a vibrating screen deck comprising of an upper and lower mesh size of 1500 and 150 micron, respectively. Fines (less than 150 micron) are packed off for recycle. Any material greater than 1500 micron (the bulk of the material leaving the drier) is taken to the next stage. Material falling between 150 and 1500 microns is deemed to be finished product and is packed off.

According to the present invention, it is preferable that no rounding stage be employed for making the granules. Rounding is avoided because it results in product found less desirable from both a coloring and a dispersibility standpoint.

The granules can be obtained in high yields (e.g., in excess of 95%) and the process can easily be operated continuously and, if appropriate, automated. The finished granules bear no resemblance to the extruded pellets in either shape or size.

The screened, dried granules are relatively free of dust and fines, which is not the case with briquetted and spray dried granules. The extruded granules are low dusting, robust and exhibit good controllable flowability and handling properties.

The extruded granules according to the present invention have greater impact strength than briquetted granules while having a similar or better ability to be very quickly re-dispersed in the end use (e.g., in concrete). The extruded granules generally demonstrate quicker dispersion properties compared to spray dried granules in final application and have equal or greater impact strength than briquetted and traditionally compacted granules. Thus, in general, the extruded granules exhibit superior combined properties of impact strength and re-dispersion compared to briquetted, compacted and spray dried granules.

As an important part of this invention, it has been found that a crumbling step applied to the product leaving the extruder can produce product with superior coloring properties to pigments themselves.

The quantity of binder/dispersant used can also be very low compared to spray drying and indeed it is possible to dispense without such additives altogether, which is extremely advantageous for pigments used in certain industries, where such additives are highly disadvantageous. This is a distinct advantage over spray dried and briquetted granules, where high levels of binders are required.

E. EXAMPLE

Example I

In this Example, the percentages stated are by weight based on the weight of the pigment used. The following steps in a representative process are used to illustrate the invention herein.

Step 1—Blending
Components:
1. 0–100% by weight (preferred 63%) metal oxide (red, yellow, black iron oxide or blends; and chromic oxide).
2. 0–100% by weight of fines from the process steps below.
3. 0–2% by weight (preferred 0.65%) dispersant (Sulphonated naphthalene formaldehyde condensate—SUPEREX CCOOO2®).
4. 0–2% by weight (preferred 0.32%) pH buffer (Sodium carbonate—NOVA CARB®).
5. 0–0.5% by weight (preferred 0.02%) wetting agent (Sodium alkylbenzene sulphonate—ARYLAN SY30®).
6. 0–2% by weight (preferred 0.65%) binder (Sodium lignosulphonate-BORRESPERSE NA®).
7. 5–30% by weight (preferred 15%) water.

Oxide and/or fines are loaded into a batch blender where a liquid mixture of dispersant, pH buffer, wetting agent, binder and water are added. Blending occurs in a vertical screw cone blender with high-speed intensifier for a time of 0.2 to 24 hours. A damp powder is formed.

Step 2—Extrusion

The damp powder is discharged from the blender and is fed into the pelleting press (OSL ORBIT 225/375). Die-holes diameter 1–6 mm; feed rate is 250–2500 kg/hr (550–5500 lb/hr).

The extruded material discharged from the pellet press is in form of cylindrical pellets.

Step 3—Drying

The pellets are discharged from the pellet press and are dried in a fluid bed dryer to remove almost all moisture from the product. Operating temperature of the dryer is between 50–170° C. Fines from the dryer gas stream are collected in a cyclone and processed through a screen.

Step 4—Comminution

The pellets are discharged from the dryer and are fed into a crumbler (BEPEX flake crusher). Screens are between 0.5–3 mm.

Step 5—Screening

Output from the crumbler is screened (ALLGAIER) to remove fines, using a screen combination between 105–2000 microns (140–10 mesh). The screening deck may optionally be fitted with an ultrasonic ring and/or a self-cleaning ball system.

Step 6—Product/Recycle

Undersize product (fines) is sent for re-processing. All other material is the final product, which is packaged into big bags. Typical particle size range is 150–2000 microns with d50 of 850 microns.

Example II

The following example shows the improvement of this invention in two different areas.
1) Color development in semi—dry concrete and 2) Pneumatic conveying.

Color development—ultimately the purpose in the field of this invention is to produce products having coloration properties in concrete; close to and, in rare situations, equal to pigment powders dispersed into concrete. The following demonstrates that the granules produced by this invention develop the same degree of color in the concrete as the powder from which they were produced. Surprisingly the granules developed using this invention can also produce a better color in concrete than the powder.

An example is given for yellow iron oxide:

| Sample | Delta E | Delta L* | Delta a* | Delta b* |
|---|---|---|---|---|
| Yellow powder | | 55.75 | 2.63 | 28.27 |
| Extrudates | 2.28 | 1.12 | −1.47 | −1.35 |
| Non-sieved chippings | 2.49 | 0.99 | −0.68 | 2.19 |
| Sieved chippings | 2.16 | 1.47 | −0.57 | 1.48 |

In this invention, a clear color advantage is attained by introducing the crumbling step to form chippings rather than using the extrudes themselves. The Delta b* number represents the extra degree of yellowness (positive delta) or lack of yellowness (negative delta). The sieved chippings show an increased yellow color development of 1.48 units on 28.27 (the absolute number obtained for the powder standard) whereas the extruded pellets show a lack of yellow color development of 1.35 units on the 28.27 of the standard powder.

2. Pneumatic conveying—trials were run at the site of a company who builds pneumatic conveying systems that transport granules from holding vessels to concrete mixers. The goal was to test the integrity of the granules produced by this invention in a pneumatic conveyor. It is known in the industry that granular iron oxide pigments can break down during the pneumatic transfer, leading to problems of pipe and filter unit blockages.

The equipment comprised standard pneumatic transfer components including:

Small feed hopper directly above weighing hopper.
Pressure transfer vessel directly below weigh hopper.
Approx. 30 m of transfer hose including 8 m vertically upward, 6 m downward and 16 m horizontal.
Separator including reverse jet air filter.

For testing the horizontal feeding, a vibrating feed chute approx. 1.5 m long, was set-up as a separate piece of equipment. Only yellow granules were tested and approx. 180 kg had been delivered in 6 buckets. It is important to note that on opening the buckets there was very little evidence of dust, hardly any discoloration of the bucket walls and lid, and when pouring into the feed hopper only a very small amount of airborne dust.

Several transfers were made using fresh material for each transfer with loads increasing from 5 kgs to 35 kgs. Following the last transfer, the 35 kgs was then recycled and part of it was transferred a further three times to test how easily the product degraded to dust.

It was possible to transfer the material in dense phase up to 20 kg. At this weight the conveying pressure rose to 1.8 bars. Above this weight all transfers were done in lean phase mode with a conveying pressure no higher than 0.6 bars. All the transfers went very smoothly, except the dense phase 20 kgs where it appeared dangerously close to blocking, and all were done within an acceptable time, even 35 kgs being transferred in less than 60 seconds. Typical industry weights would be around 20 kg, which took 20 seconds.

The amount lost as dust in each transfer was very small. Typically, the loss to dust was about 0.26% averaged over all the transfers. In a real situation it should be even less because the airborne dust generated on emptying the collection hopper would be inside the concrete mixer.

The last 35 kgs batch was put back into the feed hopper and fed through the system in a 10 kg and a 25 kgs batch. No discernable difference in transfer times or dust losses was evident. Of this, the 25 kgs batch was then put through for another two transfers meaning it had actually undergone 4 transfers in all. By the end of the 4th transfer its degradation was becoming obvious. It was more difficult to move it from the feed hopper, transfer had to be done more slowly, and there were large clouds of airborne dust generated on emptying the separator. However, it still possessed some flow characteristics when examined in a bucket and would probably have gone through at least once more without blocking.

The trials on the vibrating chute were equally impressive. Flow was completely controllable in both coarse and fine feed modes. There was no visible dust generation except for a very light haze as it fell into the collection hopper. In reality this would be sealed but for test purposes we were using an open bucket.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for the preparation of granules of iron oxide or chromium oxide, comprising:
    mixing iron oxide or chromium oxide with about 1–30 wt. % water to form a damp powder;
    pressure extruding the damp powder through at least one die containing numerous holes, thereby forming cylindrical extrudates;
    drying the extrudates, so that a final water content of the extrudates is less than about 1 weight %; and
    crumbling some or all of the extrudates to form granules.

2. A process as claimed in claim 1, wherein water is added in an amount of about 15 wt. %.

3. A process as claimed in claim 1, wherein the extrudates are cylindrical.

4. A process as claimed in claim 1, wherein a chemical composition selected from the group consisting of one or more binder/dispersants and a mixture of one or more binders and one or more dispersants is added to the mixture.

5. A process as claimed in claim 4, wherein the weight of the chemical composition is from 0.001 to 10% by weight based on the iron oxide or chromium oxide.

6. A process as claimed in claim 4, wherein the chemical composition comprises at least one material selected from the group consisting of stearates, acetates, alkyphenols, cellulosics, lignins, acrylics, epoxies, urethanes, sulphates, phosphates, formaldehyde condensates, silicates, silanes, siloxanes, titanates, and mixtures thereof.

7. A process as claimed in claim 5, wherein the chemical composition comprises at least one material selected from the group consisting of lignin sulphonate, polyacrylates, a salt of naphthalene sulphonate formaldehyde condensate which contains polycarboxylate, a salt of rosin size, a salt of disproportionated rosin, acetylenic diol on nonmetallic oxide, sodium alkylbenzene sulphonate, nonyl phenol-ethylene oxide condensates, glycerol-based ethylene oxide-propylene oxide co-polymers, and doctyl sulphosuccinates.

8. A process as claimed in claim 1, wherein the extrudates have a diameter in a range of 0.1 to 20 mm.

9. A process as claimed in claim 1, further comprising screening the extrudates to remove an undersize and an oversize fraction.

10. A process as claimed in claim 9, further comprising incorporating the screened out undersize fractions Into the mixture and extruding again.

11. Concrete containing the granules produced by claim 1.

12. A process for pigmenting cement or concrete, comprising:

mixing iron oxide or chromium oxide and a binder/dispersant with about 5–20 wt. % water to form a mixture;

pressure extruding the mixture through at least one die containing numerous holes, thereby compacting the mixture to form granules;

drying the granules so that a final water content of the extruded granules is less than about 1 weight %; and dispersing the granules into a cement or concrete base material.

13. A process as claimed in claim 12 further comprising the step of crumbling some or all of the dried granules to form non-spherical granules.

14. A process for the preparation of low dusting, free-flowing granules of iron oxide or chromium oxide for pigmenting cement or concrete, comprising:

mixing iron oxide or chromium oxide with about 5–20 wt. % water to form a mixture;

pressure extruding the mixture through at least one die containing numerous holes, thereby compacting the mixture to form granules;

drying the granules so that a final water content of the granules is less than about 1 weight %;

screening the dry granules to remove an undersize and an oversize fraction; and crumbling the oversize fraction to form non-spherical granules; and recycling either the undersize or oversize fractions or both into the mixture and pressure extruding again.

15. A process as claimed in claim 14, wherein a chemical composition selected from the group consisting of one or more binder/dispersants and a mixture of one or more binders and one or more dispersants is added to the mixture.

16. A process for the preparation of granules of iron oxide for pigmenting cement or concrete comprising:

mixing iron oxide and a chemical composition selected from the group consisting of one or more binder/dispersants and a mixture of one or more binders and one or more dispersants with a quantity of water sufficient to form a damp powder;

extruding the damp powder through an extrusion device thereby forming extrudates;

drying the extrudates to a final moisture content less than about 1 wt. % and crumbling some or all of the extrudates to form granules;

wherein the granules possess equal or superior coloration properties in concrete than the iron oxide used.

17. Concrete containing the iron oxide granules produced by claim 16.

* * * * *